July 1, 1969            V. SUNNER            3,452,717
PUPPY FEEDERS
Filed Jan. 24, 1967
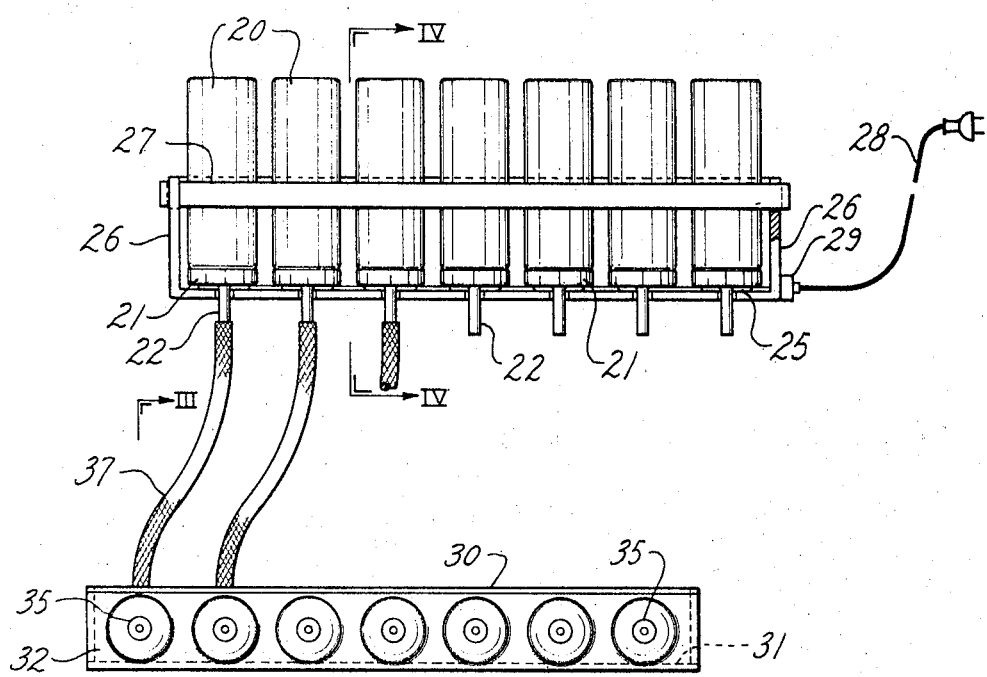
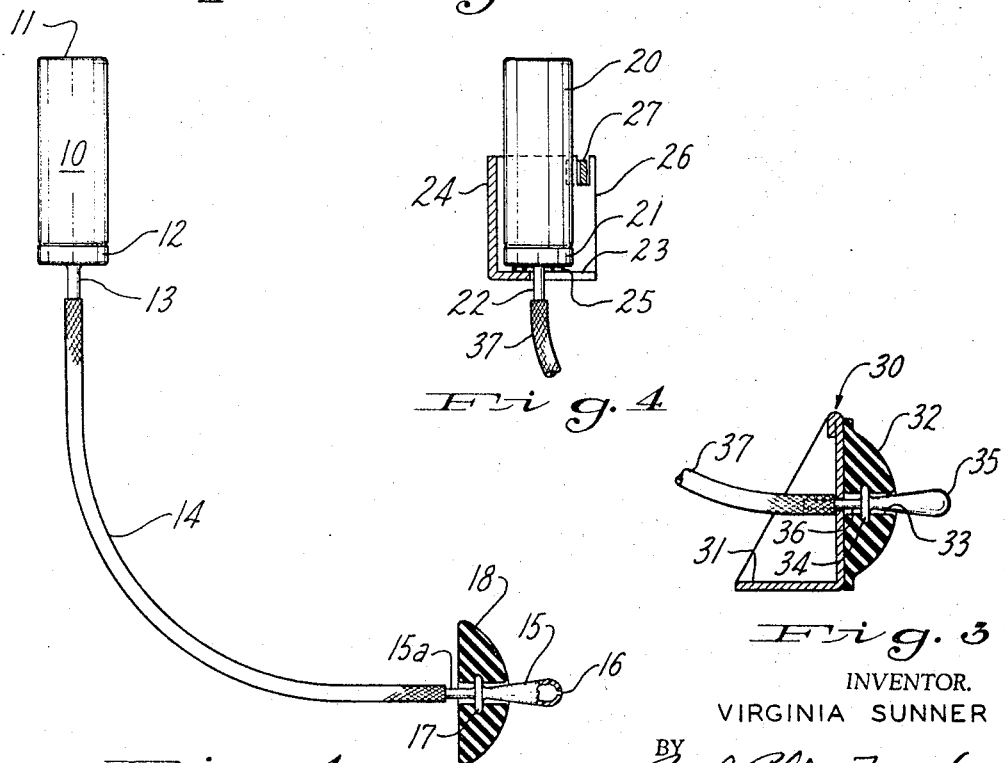
INVENTOR.
VIRGINIA SUNNER United States Patent Office 3,452,717
Patented July 1, 1969

3,452,717
PUPPY FEEDERS
Virginia Sunner, 873 Fredericka Drive,
Bethel Park, Pa. 15102
Filed Jan. 24, 1967, Ser. No. 611,292
Int. Cl. A01k 9/00
U.S. Cl. 119—71                                2 Claims

ABSTRACT OF THE DISCLOSURE

This invention relates to a feeding apparatus for puppies and like small mammals in which a closed container for liquid food is provided having a filler opening and a cover and a discharge opening connected by an elongated hollow member to a soft resilient breast-like mass having at least one aperture carrying a resilient nipple resiliently mounted therein. A heating means is preferably provided on the container for maintaining the container at a preselected temperature.

---

This invention relates to puppy feeders and particularly to feeders for nursing puppies which are too small to take solid foods.

One of the most serious problems faced by dog breeders and kennel operators is that posed by puppies which must be hand fed either because of the mother's inability to satisfactorily feed the entire litter, the mother's death or for some other reason. Puppies are extremely difficult to hand feed because of their small size which requires that they be fed very frequently but in small amounts. As a result even a small litter will require continuous attention of one person to maintain the milk at proper temperature and available to the puppy. Moreover, puppies like many mammals do not feed well unless the nipple is surrounded by some soft, preferably warm area against which they may place their forepaws and against which they may push with their noses. Any apparatus which is to be used for puppy feeding must be easily sterilized and clean and simple to assemble, disassemble and operate.

I have invented a puppy feeder which eliminates the problems which have heretofore troubled this particular area of endeavor and which provides for the first time a satisfactory solution to the problem of puppy feeding.

Preferably, I provide a puppy feeding device comprising at least one container for milk or like liquid food having a filler opening and a discharge connection, a soft resilient breast-like mass having at least one aperture therein spaced from said container, a resilient nipple removably mounted in said aperture and an elongated connecting member from said discharge connection on the container to said nipple. Preferably, there are provided a plurality of side-by-side closed containers in a housing member having heating means therein automatically controlled to maintain a preselected temperature in said containers. Preferably, the resilient breast-like mass is elongated and provided with a plurality of spaced apart apertures equal in number to the number of containers, each removably carrying a resilient nipple and each nipple connected to a container. Preferably the breast-like mass is formed of vinyl chloride plastic so that it is readily cleaned and sanitized.

In the foregoing general description I have set out certain objects, purposes and advantages of my invention. Other objects, purposes and advantages will be apparent from the following description and the accompanying drawings in which:

FIGURE 1 is a single feeder according to my invention.

FIGURE 2 is a multiple feeder arrangement according to a preferred embodiment of my invention.

FIGURE 3 is an enlarged section on the line III—III of FIGURE 2.

FIGURE 4 is a section on the line IV—IV of FIGURE 2.

Referring to the drawings, I have illustrated a puppy feeder according to a simple embodiment of my invention and suitable for feeding a single puppy, made up of a container 10 closed at one end by an integral wall 11 and at the opposite end by a threaded cap 12 having an outwardly extending connector 13 to which is attached an end of hose 14. Preferably the container, cap and hose are of plastic such as polyethylene.

The opposite end of hose 14 is connected to a connector 15a on nipple 15. The nipple is made of resilient material having a feeding aperture 16 and an annular flange 17 in the central portion of the nipple between connector 15a and aperture 16. The central portion of the nipple is surrounded by a soft resilient mass 18, preferably having the contour of a breast, i.e. gently rounded toward the aperture end of the nipple and removably engaging upon the flange 17 whereby the nipple 15 and breast-like mass 18 are readily separated for cleaning and sanitizing but when connected mutually support each other as an integral unit.

In FIGURES 2–4, I have illustrated a plurality of containers 20 similar to container 10 of FIGURE 1 and preferably of plastic, each having an open end closed by a cap 21 provided with a central connector 22. The containers 20 are held in a housing having a bottom member 23 and a back member 24 each provided with heating means 25 such as an electric resistance element. The housing has ends 26 and a front member 27 preferably spaced from the bottom to permit inspection of the containers so that the progress of feeding can be observed. An electrical feed line 28 is connected to the heating elements 25 through control thermostat 29.

An elongated frame 30 having a rearwardly extending base 31 is provided with an elongated soft, resilient breast-like member 32 of polyvinyl chloride having spaced openings 33 similar to the opening in the breast member 18 of FIGURE 1. Each opening engages a flange 34 surrounding a nipple 35 which projects out of the member 32. A connector 36 extends rearwardly from nipple 35 and is connected to a hose 37 extending from one of the connectors 22 at containers 20.

The puppy feeder disclosed hereinabove has been successfully used to feed litters of various size dogs, preferably by changing nipple sizes. A litter of dogs can be repeatedly fed with this apparatus in 10% or less time than has been required by previous hand feeding means. The apparatus has made it possible to save litters which would otherwise be impossible to handle and heretofore had to be sacrificed at considerable loss.

I claim:

1. A feeding apparatus comprising an elongated housing having a bottom member with spaced apart openings along the length thereof, end members and front and rear members, a plurality of removable closed containers in said housing equal to the spaced openings, each of said containers having a filler opening and cover for said opening provided with a discharge connection, heater means in said housing contacting said containers, an elongated frame spaced from the housing and relatively movable with respect thereto, a plurality of soft resilient breast-like masses on said frame equal in number to the containers in said housing and having an aperture therein, a resilient nipple removably mounted in each such aperture and an elongated flexible hollow connecting member connecting each discharge connection on the containers to a nipple on the frame.

2. A feeding apparatus as claimed in claim 1 wherein the breast-like mass is polyvinyl chloride.

References Cited

UNITED STATES PATENTS

| | | |
|---|---|---|
| 2,575,056 | 11/1951 | Jones. |
| 2,678,026 | 5/1954 | Rue et al. ........ 119—71 X |
| 3,081,738 | 3/1963 | Heron ............ 119—71 |
| 3,122,130 | 2/1964 | Brown et al. ...... 119—71 |
| 3,216,397 | 11/1965 | Pickard .......... 119—71 |

FOREIGN PATENTS 15,757  6/1902  Denmark.

HUGH R. CHAMBLEE, *Primary Examiner.*